United States Patent
Böhringer et al.

(10) Patent No.: US 11,459,471 B2
(45) Date of Patent: Oct. 4, 2022

(54) UV-CURABLE COMPOSITION FOR COATING OR PRINTING ON A SUBSTRATE AND/OR A SUBSTRATE SURFACE

(71) Applicant: Marabu GmbH & Co. KG, Tamm (DE)

(72) Inventors: Oliver Böhringer, Winnenden (DE); Jochen Rupp, Tamm (DE)

(73) Assignee: Marabu GmbH & Co. KG, Tamm (DE)

( * ) Notice: Subject to any disclaimer, the term of this patent is extended or adjusted under 35 U.S.C. 154(b) by 0 days.

(21) Appl. No.: 17/061,592

(22) Filed: Oct. 2, 2020

(65) Prior Publication Data
US 2021/0102079 A1   Apr. 8, 2021

(30) Foreign Application Priority Data
Oct. 7, 2019   (DE) .................... 10 2019 215 331.3

(51) Int. Cl.
| | | |
|---|---|---|
| *C09D 11/10* | (2014.01) | |
| *C09D 11/101* | (2014.01) | |
| *B41M 5/00* | (2006.01) | |
| *B41M 7/00* | (2006.01) | |
| *C09D 11/107* | (2014.01) | |

(52) U.S. Cl.
CPC ......... *C09D 11/101* (2013.01); *B41M 5/0023* (2013.01); *B41M 7/0081* (2013.01); *C09D 11/107* (2013.01)

(58) Field of Classification Search
CPC ..... C09D 11/101; C09D 11/10; C09D 11/107; C09D 4/06; C09D 133/10; C09D 133/08; C08F 290/067; C08F 20/18; C08F 20/36; B41M 5/0023; B41M 7/0081
USPC ... 522/113, 121, 119, 120, 116, 114, 74, 71, 522/81, 153
See application file for complete search history.

(56) References Cited

U.S. PATENT DOCUMENTS

| | | | |
|---|---|---|---|
| 10,414,929 B2 * | 9/2019 | Araki | C09D 11/322 |
| 2008/0090931 A1 | 4/2008 | Nagvekar et al. | |
| 2015/0361284 A1 | 12/2015 | Herlihy et al. | |
| 2015/0368491 A1 * | 12/2015 | Araki | C09D 11/40 428/131 |
| 2019/0085188 A1 | 3/2019 | Hall et al. | |
| 2019/0111452 A1 | 4/2019 | Illsley et al. | |
| 2020/0087525 A1 * | 3/2020 | Holzinger | C09D 11/10 |

FOREIGN PATENT DOCUMENTS

| | | |
|---|---|---|
| EP | 2975092 A1 | 1/2016 |
| GB | 2562169 A | 11/2018 |
| WO | 2007/129017 A1 | 11/2007 |
| WO | 2011/135089 A1 | 11/2011 |
| WO | 2018/146494 A1 | 8/2018 |
| WO | 2018/167250 A1 | 9/2018 |

\* cited by examiner

*Primary Examiner* — Sanza L. McClendon
(74) *Attorney, Agent, or Firm* — DLA Piper LLP (US)

(57) ABSTRACT

A UV-curable composition for coating or printing on a substrate and/or a substrate surface includes at least one monofunctional acrylate monomer/methacrylate monomer having a substituted or unsubstituted monocycloaliphatic hydrocarbon radical, at least one vinyl monomer having a substituted or unsubstituted heterocyclic radical, where the heterocyclic radical has at least one ring-forming nitrogen atom, at least one monofunctional acrylate monomer/methacrylate monomer having a substituted or unsubstituted bicyclic, nonaromatic hydrocarbon radical and at least one photoinitiator, wherein the UV-curable composition is free of at least one monofunctional acrylate monomer/methacrylate monomer having a substituted or unsubstituted heterocyclic, nonaromatic radical.

16 Claims, No Drawings

UV-CURABLE COMPOSITION FOR COATING OR PRINTING ON A SUBSTRATE AND/OR A SUBSTRATE SURFACE

TECHNICAL FIELD

This disclosure relates to a UV-curable composition for coating or printing on a substrate and/or a substrate surface, a coating or printing method, a kit and a substrate.

BACKGROUND

Digital printing technology, in particular inkjet printing technology, is increasingly being used for industrial printing tasks. Compared to analogous methods, digital printing technology displays increased flexibility because fixed printing forms are dispensed with. A further advantage is the possibility of decorating differently shaped objects directly in a contactless manner, i.e., without use of labels or stickers.

The direct decoration of sheets of all types, in particular for advertising purposes, is of particular importance. Important requirements demanded of direct decoration include excellent resistance of the decoration to mechanical action and rapid curing-through of the decoration, which allows fast production cycles. A further important criterion is a very wide adhesion range to a number of different substrates, in particular corresponding to the sheet materials employed in advertising technology. Examples that may be mentioned in this context are polyvinyl chloride, polymethyl methacrylate, polypropylene, polyethylene, acrylonitrile-butadiene-styrene copolymer and polystyrene.

Known paint formulations or inks are intended to achieve that objective by use of large amounts of photoinitiators. A disadvantage of that approach is that large amounts of substances that are harmful to health are introduced via the photoinitiators into the paint formulations or inks. In addition, the raw materials costs are thereby increased.

Furthermore, inks in which the required reactivity is achieved by high proportions of multifunctional acrylate monomers are known. WO 2011/135089 A1 discloses, for example, a UV-curable ink comprising at least one polyfunctional alkoxylated and/or polyalkoxylated acrylate monomer in addition to pigments, free-radical photoinitiators, dispersants and optionally further additives.

A disadvantage of inks comprising polyfunctional or multifunctional acrylate monomers is that a restricted adhesion range for different substrates is typical of particularly reactive compositions.

An inkjet printer ink comprising at least one monofunctional (meth)acrylate monomer, at least one monofunctional monomer selected from an N-vinylamide, an N-acryloylamine or a mixture thereof, at least one free-radical photoinitiator and at least one dye is known from WO 2007/129017 A1.

It could therefore be helpful to provide a UV-curable composition that avoids disadvantages occurring in conventional UV-curable compositions and, particularly when carrying out direct decoration, displays very good resistance to mechanical action and also rapid curing-through of the direct decoration. It could further be helpful to provide a coating or printing method, a kit and a coated substrate or substrate that has been printed on.

SUMMARY

We provide a UV-curable composition for coating or printing on, in particular digital printing on, a substrate and/or a substrate surface.

The substrate can be a sheet-like substrate, i.e., a board.

The substrate can, in particular, comprise a material or consist of a material selected from the group consisting of polymer, ceramic and glass. The substrate is preferably a substrate comprising a polymer or consisting of a polymer. The polymer is preferably selected from the group consisting of polyvinyl chloride, polymethyl methacrylate, polypropylene, polyethylene, acrylonitrile-butadiene-styrene copolymer, polystyrene, polyamide, copolymers of at least two of the materials mentioned and blends, i.e., mixtures, of at least two of the materials mentioned.

The UV-curable composition comprises the following:

at least one monofunctional acrylate monomer/methacrylate monomer having a substituted or unsubstituted monocycloaliphatic hydrocarbon radical, i.e., at least one monofunctional acrylate monomer having a substituted or unsubstituted monocycloaliphatic hydrocarbon radical and/or at least one monofunctional methacrylate monomer having a substituted or unsubstituted monocycloaliphatic hydrocarbon radical, at least one vinyl monomer having a substituted or unsubstituted heterocyclic radical, where the heterocyclic radical has at least one ring-forming nitrogen atom, in particular only one ring-forming nitrogen atom or a plurality of ring-forming nitrogen atoms, in particular two ring-forming nitrogen atoms, at least one monofunctional acrylate monomer/methacrylate monomer having a substituted or unsubstituted bicyclic, nonaromatic hydrocarbon radical, i.e., at least one monofunctional acrylate monomer having a substituted or unsubstituted bicyclic, nonaromatic hydrocarbon radical and/or at least one monofunctional methacrylate monomer having a substituted or unsubstituted bicyclic, nonaromatic hydrocarbon radical, and at least one photoinitiator.

DETAILED DESCRIPTION

The UV-curable composition is preferably free of at least one monofunctional acrylate monomer/methacrylate monomer having a substituted or unsubstituted heterocyclic, nonaromatic radical, in particular substituted or unsubstituted heterocyclic, nonaromatic organic radical, i.e., free of at least one monofunctional acrylate monomer having a substituted or unsubstituted heterocyclic, nonaromatic radical, in particular substituted or unsubstituted heterocyclic, nonaromatic organic radical, and/or at least one monofunctional methacrylate monomer having a substituted or unsubstituted heterocyclic, nonaromatic radical, in particular substituted or unsubstituted heterocyclic, nonaromatic organic radical.

The expression "monofunctional acrylate monomer" refers to a monomer having only one acryloyl group per monomer molecule.

The expression "multifunctional acrylate monomer" refers to a monomer having two or more acryloyl groups per monomer molecule.

The expression "monofunctional methacrylate monomer" refers to a monomer having only one methacryloyl group per monomer molecule.

The expression "multifunctional methacrylate monomer" refers to a monomer having two or more methacryloyl groups per monomer molecule.

The expression "monocycloaliphatic hydrocarbon radical" refers to an aliphatic hydrocarbon radical, in particular an alkyl, alkenyl or alkynyl radical, that contains only a single hydrocarbon ring or consists of only a single hydrocarbon ring.

The expression "vinyl monomer" refers to a monomer having at least one vinyl group, i.e., at least one ethene radical (ethylene radical), in particular only one vinyl group, i.e., only one ethene radical, or a plurality of vinyl groups, i.e., a plurality of ethene radicals.

The expression "heterocyclic radical, where the heterocyclic radical has at least one ring-forming nitrogen atom" refers to an organic radical comprising a ring or a plurality of rings or consists of a ring or a plurality of rings, where the ring or the rings comprises or comprise at least one ring-forming nitrogen atom, i.e., at least one nitrogen atom as ring member, in addition to ring-forming carbon atoms. In particular, the ring or rings can have only one nitrogen atom as ring member or a plurality of, in particular two, nitrogen atoms as ring members.

The expression "N-vinyl monomer" refers to a monomer having a vinyl group, where the vinyl group is covalently bound to a nitrogen atom, preferably to a nitrogen atom of a heterocyclic radical, of the monomer.

The expression "heterocyclic, nonaromatic organic radical" refers to a nonaromatic organic radical containing a ring or a plurality of rings or consisting of a ring or a plurality of rings, where the ring or the rings contains or contain at least one ring-forming heteroatom, in particular two ring-forming heteroatoms, for example, an oxygen atom and/or a nitrogen atom or two oxygen atoms, in addition to ring-forming carbon atoms.

The expression "bicyclic, nonaromatic hydrocarbon radical" refers to an aliphatic hydrocarbon radical, in particular an alkyl, alkenyl or alkynyl radical, containing two linked hydrocarbon rings or consisting of two linked hydrocarbon rings. Depending on the way in which the rings are linked, the bicyclic, nonaromatic hydrocarbon radical can be a fused bicyclic hydrocarbon radical, a spirocyclic hydrocarbon radical or a bridged bicyclic hydrocarbon radical. The bicyclic, nonaromatic hydrocarbon radical is preferably a bridged bicyclic hydrocarbon radical.

The expression "UV-curable composition" refers to a composition that can be partially or fully cured under the action of ultraviolet radiation (UV radiation).

The expression "ultraviolet radiation (UV radiation)" refers to radiation in a wavelength of 100 nm to 450 nm, in particular 100 nm to 420 nm.

We surprisingly found that a composition comprising the types of monomers described above and will be explained in more detail below is particularly suitable as UV-curable composition for coating or printing on, in particular digital printing on, substrates and/or substrate surfaces. Our compositions advantageously display excellent reactivity and also, in particular, rapid curing-through, a satisfactory adhesion behavior on many substrates and/or substrate surfaces, reduced blocking resistance, i.e., a low tendency to stick on stacking, joining or rolling-up of two or more substrates which have been coated or printed on, in particular digitally printed on, especially at elevated pressure and/or elevated temperature, and also, in the UV-cured state, mechanical robustness and in particular weathering resistance.

A further advantage is that the composition can comprise smaller amounts of a photoinitiator compared to conventional UV-curable compositions. As a result, health risks and in particular production costs can be particularly advantageously reduced.

The substituted or unsubstituted monocycloaliphatic hydrocarbon radical may be a monocycloalkyl radical, in particular having 3 ring-forming carbon atoms to 8 ring-forming carbon atoms, preferably 5 ring-forming carbon atoms or 6 ring-forming carbon atoms.

The at least one monofunctional acrylate monomer/methacrylate monomer having a substituted or unsubstituted monocycloaliphatic hydrocarbon radical may be selected from the group consisting of 3,3,5-trimethylcyclohexyl acrylate, 2-(1,1-dimethylethyl)cyclohexyl acrylate, 3-(1,1-dimethylethyl)cyclohexyl acrylate, 4-(1,1-dimethylethyl)cyclohexyl acrylate, 4-tert-butylcyclohexyl acrylate, 4-tert-butylcyclohexyl methacrylate, cyclohexyl methacrylate, 3,3,5-trimethylcyclohexyl methacrylate and mixtures of at least two of the monofunctional acrylate monomers/methacrylate monomers mentioned.

Preference is given to the at least one monofunctional acrylate monomer having a substituted or unsubstituted monocycloaliphatic hydrocarbon radical being 4-tert-butylcyclohexyl acrylate and/or the at least one monofunctional methacrylate monomer having a substituted or unsubstituted monocycloaliphatic hydrocarbon radical being 3,3,5-trimethylcyclohexyl acrylate.

The at least one monofunctional acrylate monomer/methacrylate monomer having a substituted or unsubstituted monocycloaliphatic hydrocarbon radical may be present in a proportion of 5% by weight to 35% by weight, in particular 5% by weight to 30% by weight, in particular 10% by weight to 25% by weight, preferably 15% by weight to 25% by weight, based on the total weight of the composition.

The UV-curable composition may be free of a monofunctional acrylate monomer/methacrylate monomer having a substituted or unsubstituted linear, i.e., acyclic, aliphatic hydrocarbon radical.

The at least one vinyl monomer having a substituted or unsubstituted heterocyclic radical, where the heterocyclic radical has at least one ring-forming nitrogen atom, may be at least one N-vinyl monomer. A vinyl group of the at least one N-vinyl monomer is preferably covalently bound to a ring-forming nitrogen atom of the substituted or unsubstituted heterocyclic radical.

The substituted or unsubstituted heterocyclic radical of the vinyl monomer can, in particular, have from 3 ring-forming atoms to 8 ring-forming atoms. The substituted or unsubstituted heterocyclic radical of the vinyl monomer preferably has from 5 ring-forming atoms to 7 ring-forming atoms.

The substituted or unsubstituted heterocyclic radical of the vinyl monomer may be a substituted or unsubstituted heterocyclic aryl radical, i.e., a substituted or unsubstituted aromatic heterocyclic radical. The vinyl monomer having a substituted or unsubstituted heterocyclic radical, where the heterocyclic radical has at least one ring-forming nitrogen atom, is preferably selected from the group consisting of N-vinylimidazole (1-ethenyl-1H-imidazole), methylated N-vinylimidazole and mixtures of at least two of the vinyl monomers mentioned.

The substituted or unsubstituted heterocyclic radical of the vinyl monomer may be a substituted or unsubstituted heterocycloalkyl radical. The vinyl monomer having a substituted or unsubstituted heterocyclic radical, where the heterocyclic radical has at least one ring-forming nitrogen atom, is preferably selected from the group consisting of vinylmethyloxazolidinone (5-methyl-3-vinyl-2-oxazolidinone), vinylpyrrolidone (N-vinyl-2-pyrrolidone), N-vinylcaprolactam (1-vinylhexahydro-2H-azepin-2-one), N-vinyl-2-piperidone (N-vinyl-δ-valerolactam), N-vinylcaprolactone and mixtures of at least two of the vinyl monomers mentioned.

The vinyl monomer having a substituted or unsubstituted heterocyclic radical, where the heterocyclic radical has at least one ring-forming nitrogen atom, may be selected from the group consisting of vinylmethyloxazolidinone (5-methyl-3-vinyl-2-oxazolidinone), vinylpyrrolidone (N-vinyl-2-pyrrolidone), N-vinylcaprolactam (1-vinylhexahydro-2H-azepin-2-one), N-vinyl-2-piperidone (N-vinyl-δ-valerolactam), N-vinylcaprolactone, N-vinylimidazole (1-ethenyl-1H-imidazole), methylated N-vinylimidazole and mixtures of at least two of the vinyl monomers mentioned.

The vinyl monomer having a substituted or unsubstituted heterocyclic radical, where the heterocyclic radical has at least one ring-forming nitrogen atom, is particularly preferably vinylmethyloxazolidinone(5-methyl-3-vinyl-2-oxazolidinone).

The at least one vinyl monomer having a substituted or unsubstituted heterocyclic radical, where the heterocyclic radical has at least one ring-forming nitrogen atom, may be present in a proportion of 10% by weight to 50% by weight, in particular 25% by weight to 40% by weight, preferably 30% by weight to 40% by weight, based on the total weight of the composition.

The bicyclic, nonaromatic hydrocarbon radical may be a bridged hydrocarbon radical.

The at least one monofunctional acrylate monomer/methacrylate monomer having a substituted or unsubstituted bicyclic, nonaromatic hydrocarbon radical may be selected from the group consisting of isobornyl acrylate, isobornyl methacrylate, dihydrocyclopentadienyl acrylate, ethoxylated dihydrocyclopentadienyl acrylate and mixtures of at least two of the monofunctional acrylate monomers/methacrylate monomers mentioned.

The at least one monofunctional acrylate monomer having a substituted or unsubstituted bicyclic, nonaromatic hydrocarbon radical is preferably isobornyl acrylate.

The at least one monofunctional acrylate monomer/methacrylate monomer having a substituted or unsubstituted bicyclic, nonaromatic hydrocarbon radical may be present in a proportion of 5% by weight to 30% by weight, in particular 10% by weight to 25% by weight, preferably 15% by weight to 25% by weight, based on the total weight of the composition.

The molar mass ratio of the at least one vinyl monomer having a substituted or unsubstituted heterocyclic radical, where the heterocyclic radical has at least one ring-forming nitrogen atom, to the at least one monofunctional acrylate monomer/methacrylate monomer having a substituted or unsubstituted bicyclic, nonaromatic hydrocarbon radical is preferably >1.

Preference is given to the at least one vinyl monomer having a substituted or unsubstituted heterocyclic radical, where the heterocyclic radical has at least one ring-forming nitrogen atom, being vinylmethyloxazolidinone or N-vinylcaprolactone and the at least one monofunctional acrylate monomer having a substituted or unsubstituted bicyclic, nonaromatic hydrocarbon radical being isobornyl acrylate.

The molar ratio of the sum of the at least one vinyl monomer having a substituted or unsubstituted heterocyclic radical, where the heterocyclic radical has at least one ring-forming nitrogen atom, and the at least one monofunctional acrylate monomer/methacrylate monomer having a substituted or unsubstituted bicyclic, nonaromatic hydrocarbon radical to the at least one monofunctional acrylate monomer/methacrylate monomer having a substituted or unsubstituted monocycloaliphatic hydrocarbon radical is particularly preferably 1 to 8, preferably 1 to 5, more preferably 2 to 4, in particular 3 to 4. The advantages are particularly strongly pronounced at the molar ratios disclosed in this paragraph.

Preference can also be given to the UV-curable composition further comprising at least one N-vinyl monomer, where the N-vinyl monomer is free of a heterocyclic radical. The N-vinyl monomer can be, for example, N-vinylformamide.

The at least one photoinitiator may be of Norrish type I.

The expression "photoinitiator of Norrish type I" refers to a photoinitiator that, in particular, under the action of ultraviolet radiation (UV radiation) disintegrates into two free radicals, usually by a dissociation. The free radicals formed can trigger a chain polymerization and/or crosslinking with partial or full curing of the composition.

The at least one photoinitiator is preferably selected from the group consisting of 2-hydroxy-1-(4-[4-(2-hydroxy-2-methylpropionyl)benzyl]phenyl)-2-methylpropan-1-one, 1-hydroxycyclohexyl phenyl ketone, phenylbis-2,4,6-trimethylbenzoylphosphine oxide, 2-benzyl-2-dimethylamino-1-(4-morpholinophenyl)butan-1-one, 2,4,6-trimethylbenzoyldiphenylphosphine oxide, 2-dimethylamino-2-(4-methylbenzyl)-1-(4-morpholin-4-ylphenyl)butan-1-one, 2-hydroxy-2-methyl-1-phenylpropan-1-one, 2-hydroxy-2-methylpropiophenone, 2,2-dimethoxy-2-phenylacetophenone, 2-methyl-1-[4-(methylthio)phenyl]-2-morpholinopropan-1-one and mixtures of at least two of the photoinitiators mentioned.

The at least one photoinitiator may be present in a proportion of <15% by weight, in particular 1% by weight to 14% by weight, based on the total weight of the composition. As mentioned above, low proportions of photoinitiator, in particular as described in this paragraph, have the advantage that the UV-curable composition does not come up against, or comes up against lesser, concerns about hazards to health, and can, in particular, be produced cheaply.

Furthermore, the UV-curable composition can comprise at least one colorant, in particular at least one dye and/or at least one pigment, preferably at least one pigment. In other words, preference can be given to the UV-curable composition being a UV-curable ink or UV-curable ink composition.

The at least one pigment can, in particular, be selected from the group consisting of titanium dioxide, carbon black, aluminium, inorganic pigments, organic pigments and mixtures of at least two of the pigments mentioned.

The at least one pigment is preferably an organic pigment, in particular selected from the group consisting of pigments based on quinacridones, pigments based on isoindolines, pigments based on isoindolinones, pigments based on phthalocyanines, pigments based on benzimidazolones and mixtures of at least two of the pigments mentioned.

Furthermore, the at least one colorant, preferably the at least one pigment, can be present in a proportion of 0.1% by weight to 20% by weight, in particular 0.3% by weight to 18% by weight, preferably 1% by weight to 18% by weight, based on the total weight of the composition.

The UV-curable composition may be dye- and/or pigment-free, in particular colorant-free. For example, the composition can be a UV-curable composition for producing what is known as a topcoat, i.e., a final layer or end layer (finish) of a coating, for example, a label, a sticker or direct decoration.

Furthermore, the UV-curable composition can additionally comprise a non-UV-reactive polymer.

The expression "non-UV-reactive polymer" refers to a polymer that is not crosslinkable under the action of ultraviolet radiation (UV radiation).

The adhesion of the UV-curable composition to a substrate and/or a substrate surface and also the blocking resistance can advantageously be additionally improved by a non-UV-reactive polymer.

The non-UV-reactive polymer is preferably an aldehyde resin and/or ketone resin and/or polyester resin.

The non-UV-reactive polymer can be present in a proportion of 0.5% by weight to 5.0% by weight, in particular 0.8% by weight to 5.0% by weight, preferably 1.5% by weight to 5.0% by weight, based on the total weight of the composition.

The UV-curable composition may further comprise a solid resin, in particular a partially acrylated solid resin. The UV-curable composition preferably comprises a solution of the solid resin in an acrylate monomer, in particular in 2-phenoxyethyl acrylate or isobornyl acrylate.

The expression "partially acrylated solid resin" refers to a solid resin that is partially functionalized by acryloyl groups.

The printing quality can particularly advantageously be additionally improved by a partially acrylated solid resin as a result of improved droplet formation and the mechanical properties of the cured composition, for example, scratch resistance and/or adhesive strength.

The partially acrylated solid resin can be selected from the group consisting of aldehyde resins, ketone resins, polyester resins and mixtures of at least two of the partially acrylated solid resins mentioned.

Further, the partially acrylated solid resin can be present in a proportion of 1% by weight to 10% by weight, in particular 3% by weight to 10% by weight, preferably 5% by weight to 10% by weight, based on the total weight of the composition.

The UV-curable composition can also further comprise at least one additive selected from the group consisting of multifunctional acrylate monomer, multifunctional methacrylate monomer, multifunctional oligomer, stabilizer, wetting agent, filler, levelling additive, lubricant and mixtures of at least two of the additives mentioned.

The expression "multifunctional oligomer" refers to an oligomer having at least two different functional groups.

The expression "levelling additive" refers to an additive that is able to level out unevennesses in a layer produced by application of the composition to a substrate surface.

The multi-functional acrylate monomer can be selected from the group consisting of (octahydro-4,7-methano-1H-indenediyl)bis(methylene) diacrylate, tri cyclodecanedimethanol diacrylate, butanediol diacrylate, 1,2-ethylene glycol diacrylate, 1,12-dodecanol diacrylate, 1,10-decanediol diacrylate, ester diol diacrylate, propoxylated 2-neopentyl glycol diacrylate, tris(2-hydroxyethyl)isocyanurate triacrylate, propoxylated neopentyl glycol diacrylate, hexanediol diacrylate, tripropylene glycol diacrylate, tetraethylene glycol diacrylate, dipropylene glycol diacrylate, ethoxylated bisphenol A diacrylate, alkoxylated hexanediol diacrylate, 3-methyl-1,5-pentanediol diacrylate, alkoxylated cyclohexanedimethanol diacrylate, tri cyclodecanedimethanol diacrylate, trimethylolpropane triacrylate, alkoxylated trimethylolpropane triacrylate, ethoxylated trimethylolpropane triacrylate, glycerol propoxylate triacrylate, pentaerythritol triacrylate, dipentaerythritol pentaacrylate, dipentaerythritol hexaacrylate, ethoxylated pentaerythritol tetraacrylate, pentaerythritol tetraacrylate, ditrimethylolpropane tetraacrylate, polyethylene glycol diacrylates and mixtures of at least two of the multifunctional acrylate monomers mentioned.

The multifunctional acrylate monomer can be present in a proportion of 0.1% by weight to 2.0% by weight, in particular 0.3% by weight to 2.0% by weight, preferably 0.5% by weight to 2.0% by weight, based on the total weight of the composition.

The multifunctional methacrylate monomer can be selected from the group consisting of 1,12-dodecanol dimethacrylate, hexanediol dimethacrylate, ethoxylated bisphenol A dimethacrylate, trimethylolpropane trimethacrylate, pentaerythritol tetramethacrylate and mixtures of at least two of the multifunctional methacrylate monomers mentioned.

The multifunctional methacrylate monomer can be present in a proportion of 0.1% by weight to 5.0% by weight, in particular 0.5% by weight to 5.0% by weight, preferably 0.8% by weight to 5.0% by weight, based on the total weight of the composition.

The multifunctional acrylate monomer and the multifunctional methacrylate monomer together are preferably present in a proportion of <15% by weight, in particular 5% by weight to 10% by weight, preferably 1% by weight to 7% by weight, based on the total weight of the composition.

The multifunctional oligomer can be selected from the group consisting of polyethers, acrylates and mixtures of at least two of the multifunctional oligomers mentioned.

The multifunctional oligomer can be present in a proportion of 0.5% by weight to 6.5% by weight, in particular 0.8% by weight to 6.5% by weight, preferably 1.0% by weight to 6.5% by weight, based on the total weight of the composition.

Further, the UV-curable composition can be in particular free of a multifunctional acrylate monomer and/or a multifunctional methacrylate monomer.

Further, the UV-curable composition can be in particular free of a multifunctional oligomer, in particular a multifunctional acrylate oligomer and/or a multifunctional methacrylate oligomer.

Further, apart from the at least one monofunctional acrylate monomer/methacrylate monomer having a substituted or unsubstituted monocycloaliphatic hydrocarbon radical, the at least one vinylmonomer having a substituted or unsubstituted heterocyclic radical, where the heterocyclic radical has at least one ring-forming nitrogen atom, and the at least one monofunctional acrylate monomer/methacrylate monomer having a substituted or unsubstituted bicyclic, nonaromatic hydrocarbon radical, the UV-curable composition can in particular comprise only a further curable or polymerizable monomer, in particular only a further acrylate monomer and/or only a further methacrylate monomer, which are/is part of a pigment paste and/or which are/is a solvent for a solid resin, in particular partially acrylated solid resin, in particular as mentioned before, wherein the solid resin is preferably part of the UV-curable composition.

Further, the UV-curable composition can in particular consist of the at least one monofunctional acrylate monomer/methacrylate monomer having a substituted or unsubstituted monocycloaliphatic hydrocarbon radical, the at least one vinyl monomer having a substituted or unsubstituted heterocyclic radical, where the heterocyclic radical has at least one ring-forming nitrogen atom, the at least one monofunctional acrylate monomer/methacrylate monomer having a substituted or unsubstituted bicyclic, nonaromatic hydrocarbon radical, the at least one photoinitiator and optionally of at least one further ingredient being selected from the group consisting of at least one colorant, at least one dye, at least one pigment, a non-UV-reactive polymer, a solid resin, in particular a partially acrylated solid resin, a multifunctional acrylate monomer, a multifunctional methacrylate monomer, a multifunctional oligomer, in particular a multifunctional acrylate oligomer and/or a multifunctional methacrylate oligomer, a stabilizer, a wetting agent, a filler, a levelling additive, a lubricant and mixtures of at least two of the afore-mentioned additional ingredients. With respect to the afore-mentioned additional ingredients, reference is made in its entirety to the previous description.

Further, apart from the at least one monofunctional acrylate monomer/methacrylate monomer having a substituted or unsubstituted monocycloaliphatic hydrocarbon radical, the at least one vinyl monomer having a substituted or unsubstituted heterocyclic radical, where the heterocyclic radical has at least one-ring forming nitrogen atom, and the at least one monofunctional acrylate monomer/methacrylate monomer having a substituted or unsubstituted bicyclic, nonaromatic hydrocarbon radical, the UV-curable composition can in particular comprise no further curable or polymerizable monomers, in particular no further acrylate monomers and/or no further methacrylate monomers.

We also provide a method of coating or printing on, in particular digital printing on, a substrate and/or a substrate surface, where the method comprises:

coating or printing on, in particular digital printing on, a substrate and/or a substrate surface using a UV-curable composition, and UV curing the UV-curable composition.

The substrate and/or the substrate surface is/are preferably printed on by a digital printing process, in particular inkjet printing process, using the UV-curable composition.

The expression "digital printing process" refers to a printing process in which the image to be printed is transferred directly from a computer into a printing machine without a static or fixed printing form being utilized.

The expression "inkjet printing process" refers to a process in which small droplets of liquid ink are produced and applied to a substrate and/or a substrate surface. This first gives the possibility of producing a continuous inkjet (CIJ) or second gives the possibility of discontinuously producing individual droplets that are produced and transferred to the substrate only when required (drop-on-demand, DOD).

The substrate and/or the substrate surface can in principle be coated or printed on only partially or completely, i.e., over the full area, using the UV-curable composition.

As regards further features and advantages of the method, reference is made, to avoid repetition, to all that has been said above. The features and advantages described there, especially with regard to the UV-curable composition, also apply analogously to the method.

We further provide a kit, in particular in the form of an ink set, for coating or printing on, in particular digital printing on, a substrate and/or a substrate surface.

The kit comprises, physically separately from one another, at least two different UV-curable compositions, in particular at least two different colorant-containing, preferably pigment-containing, UV-curable compositions, and/or at least one UV-curable composition, in particular at least one colorant-containing, preferably pigment-containing, UV-curable composition, and a non-UV-curable composition, and/or at least one UV-curable composition, in particular at least one colorant-containing, preferably pigment-containing, UV-curable composition, and at least one further component selected from the group consisting of UV lamp, LED radiator, LED-UV dryer unit, digital printing head, digital printing unit, pigment dispersions and combinations of at least two of the components mentioned.

The at least two different UV-curable compositions preferably differ in respect of a colorant or the colorant, in particular in respect of a pigment or the pigment.

The UV lamp can be, for example, a mercury vapor lamp.

The digital printing head can, for example, be an inkjet printing head.

The digital printing unit can be, for example, an inkjet printing unit.

The pigment dispersions can be, for example, pigment dispersions for producing a white, colored, metallic or colorless ink.

In particular, the pigment dispersions can be titanium dioxide-containing dispersions, carbon black-containing dispersions, aluminium-containing dispersions, inorganic pigment dispersions, organic pigment dispersions or mixtures of at least two of the pigment dispersions mentioned.

As regards further features and advantages of the kit, reference is made, to avoid repetition, to all of the description up to now, in particular to what has been said above. The features and advantages described there, especially in respect of the UV-curable composition, also apply analogously to the kit.

We still further provide a substrate that has been coated or printed on, in particular digitally printed on, using a UV-curable composition.

The substrate can be a sheet-like substrate, i.e., a board.

The substrate can, in particular, comprise a material or consist of a material selected from the group consisting of polymer, ceramic and glass. The substrate is preferably a substrate which comprises a polymer or consists of a polymer. The polymer is preferably selected from the group consisting of polyvinyl chloride, polymethyl methacrylate, polypropylene, polyethylene, acrylonitrile-butadiene-styrene copolymer, polystyrene, polyamide, copolymers of at least two of the materials mentioned and blends, i.e., mixtures, of at least two of the materials mentioned.

As regards further features and advantages of the substrate, reference is, to avoid repetition, likewise made to all of the description up to now, in particular to what has been said above. The features and advantages described there, in particular in respect of the UV-curable composition, also apply analogously to the substrate.

Further features and advantages may be derived from the description below of preferred examples. Individual features can be realized either alone or in combination with one another. The examples described below serve merely to illustrate selected aspects of this disclosure further, without restricting the disclosure to the disclosure content of the examples.

EXAMPLES

Samples of the inks applied using a 12 µm doctor blade to PP multiskin sheet material were compared. Curing was effected using a UV belt dryer from IST, model M-20-2x1-TR-CMK-SLC at 366 nm and 120 W/cm, belt speed 20 m/min.

Compared to printing tests, the comparison of coatings applied by doctor blade eliminates influences of machine and software and led to the following results.

Evaluation

Blocking (sticking together after stacking): samples of 10×10 cm were stacked and loaded with an additional weight of 4 kg for 12 hours immediately after UV curing. The samples should then not have stuck to one another.

Adhesion: in accordance with ISO240 cross-cut with adhesive tape test. GT0=no damage, GT5=complete detachment.

Example of Our UV-Curable Composition

Our composition was a pigment-containing UV-curable composition (ink) having the following constituents (in % by weight):

| | |
|---|---|
| IBOA[1] | 24.2% |
| VMox[1] | 33.0% |
| TBCH[1] | 19.1% |
| Levelling additive | 0.1% |
| Stabilizer | 0.1% |
| Norrish I photoinitiator | 11.5% |
| Rokracure 7250[5] | 4.5% |
| UV cyan paste[3] | 7.5% |

We found that adhesion of the composition was very good. After curing at 20 m/min-40 m/min, a cross-cut value of 0 (GT0; very good adhesive strength) was obtained both on a substrate composed of polypropylene and on a substrate composed of rigid polyvinyl chloride. The cross-cut value on PMMA was 1.

Comparative Example of a UV-Curable Composition

The composition was a pigment-containing UV-curable composition (ink) having the following constituents (in % by weight):

| | |
|---|---|
| IBOA[1] | 28.2% |
| ACMO[1] | 33.0% |
| CTFA[1] | 15.1% |
| Levelling additive | 0.1% |
| Stabilizer | 0.1% |
| Norrish I photoinitiator | 11.5% |
| Rokracure 7250[5] | 4.5% |
| UV cyan paste[3] | 7.5% |

We found that adhesion of the composition was poor. After curing at 20 m/min-40 m/min, a cross-cut value of 4 (GT0: very good adhesive strength, GT5: no adhesion) was obtained on a substrate composed of polypropylene.

Legends:
1) Monofunctional acrylate monomers/methacrylate monomers
   IBOA: Isobornyl acrylate
   ACMO: N-Acryloylmorpholine
   TBCH: 4-tert-Butylcyclohexyl acrylate
   TMCHA: 3,3,5-Trimethylcyclohexyl acrylate
   VMox: Vinylmethyloxazolidinone
   CTFA: Cyclic trimethylolpropane formal acrylate
2) Multifunctional monomers here bifunctional monomers in this example
3) Commercial pigment pastes having a proportion of monofunctional acrylate monomer of 30-70%
4) Amine compound (synergist)
5) Partially acrylated solid resin dissolved in monofunctional monomer
6) Trifunctional monomers, e.g., ethoxylated (3) trimethylolpropane triacrylate Aliphatic urethane diacrylates 30% in monofunctional monomer

The invention claimed is:

1. A UV-curable composition for coating or printing on a substrate and/or a substrate surface comprising:
   at least one monofunctional acrylate monomer/methacrylate monomer having a substituted or unsubstituted monocycloaliphatic hydrocarbon radical,
   at least one vinyl monomer having a substituted or unsubstituted heterocyclic radical, where the heterocyclic radical has at least one ring-forming nitrogen atom,
   at least one monofunctional acrylate monomer/methacrylate monomer having a substituted or unsubstituted bicyclic, nonaromatic hydrocarbon radical and
   at least one photoinitiator,
   wherein the UV-curable composition is free of at least one monofunctional acrylate monomer/methacrylate monomer having a substituted or unsubstituted heterocyclic, nonaromatic radical, and
   the at least one vinyl monomer having a substituted or unsubstituted heterocyclic radical is vinylmethyloxazolidinone.

2. The UV-curable composition according to claim 1, wherein the monocycloaliphatic hydrocarbon radical is a monocycloalkyl radical.

3. The UV-curable composition according to claim 1, wherein the monocycloaliphatic hydrocarbon radical is a monocycloalkyl radical having 3 ring-forming carbon atoms to 8 ring-forming carbon atoms.

4. The UV-curable composition according to claim 1, wherein the at least one monofunctional acrylate monomer/methacrylate monomer having a substituted or unsubstituted monocycloaliphatic hydrocarbon radical is selected from the group consisting of 3,3,5-trimethylcyclohexyl acrylate, 2-(1,1-dimethyl ethyl)cyclohexyl acrylate, 3-(1,1-di-methylethyl)cyclohexyl acrylate, 4-(1,1-dimethylethyl)cyclohexyl acrylate, 4-tert-butylcyclohexyl acrylate, 4-tert-butylcyclohexyl methacrylate, cyclohexyl methacrylate, 3,3,5-trimethylcyclohexyl methacrylate and mixtures of at least two of the monofunctional acrylate monomers/methacrylate monomers.

5. The UV-curable composition according to claim 1, wherein
   the at least one monofunctional acrylate monomer/methacrylate monomer having a substituted or unsubstituted monocycloaliphatic hydrocarbon radical is present in a proportion of 15% by weight to 25% by weight,
   and/or
   the at least one vinyl monomer having a substituted or unsubstituted heterocyclic radical is present in a proportion of 30% by weight to 40% by weight,
   and/or
   the at least one monofunctional acrylate monomer/methacrylate monomer having a substituted or unsubstituted bicyclic, nonaromatic hydrocarbon radical is present in a proportion of 15% by weight to 25% by weight,
   and/or
   the at least one photoinitiator is present in a proportion of <15% by weight, based on the total weight of the composition.

6. The UV-curable composition according to claim 1, wherein the UV-curable composition is free of a monofunctional acrylate monomer/methacrylate monomer having a substituted or unsubstituted linear aliphatic hydrocarbon radical.

7. The UV-curable composition according to claim 1, wherein the bicyclic, nonaromatic hydrocarbon radical is a bridged hydrocarbon radical.

8. The UV-curable composition according to claim 1, wherein the at least one monofunctional acrylate monomer/methacrylate monomer having a substituted or unsubstituted bicyclic, nonaromatic hydrocarbon radical is selected from the group consisting of isobornyl acrylate, isobornyl methacrylate, dihydrocyclopentadienyl acrylate, ethoxylated dihydrocyclopentadienyl acrylate and mixtures of at least two of the monofunctional acrylate monomers/methacrylate monomers having a substituted or unsubstituted bicyclic nonaromatic hydrocarbon radical.

9. The UV-curable composition according to claim 1, wherein the at least one photoinitiator is Norrish type I.

10. The UV-curable composition according to claim 1, wherein the at least one photoinitiator is of Norrish type I selected from the group consisting of 2-hydroxy-1-(4-[4-(2-hydroxy-2-meth-ylpropionyl)benzyl]phenyl)-2-methylpropan-1-one, 1-hydroxycyclohexyl phenyl ketone, phenyl-bis-2,4,6-trimethylbenzoylphosphine oxide, 2-benzyl-2-dimethylamino-1-(4-morpholinophen-yl)butan-1-one, 2,4,6-trimethylbenzoyldiphenylphosphine oxide, 2-dimethylamino-2-(4-methyl-benzyl)-1-(4-morpholin-4-ylphenyl)butan-1-one, 2-hydroxy-2-methyl-1-phenylpropan-1-one, 2-hydroxy-2-methylpropiophenone, 2,2-dimethoxy-2-phenylacetophenone, 2-methyl-1-[4-(meth-ylthio)phenyl]-2-morpholinopropan-1-one and mixtures of at least two of the photoinitiators.

11. A method of coating or printing on a substrate and/or a substrate surface, comprising:
    coating or printing on a substrate surface the UV-curable composition according to claim 1, and
    UV curing the composition.

12. The method according to claim 11, wherein the printing is digital printing.

13. A kit for coating or printing on a substrate and/or a substrate surface, comprising, physically separately from one another,
    at least two different ones of the UV-curable composition according to claim 1
    and/or
    at least one UV-curable composition according to claim 1 and a non-UV-curable composition
    and/or
    at least one UV-curable composition according to claim 1 and at least one further component selected from the group consisting of UV lamp, LED radiator, LED-UV dryer unit, digital printing head, digital printing unit, pigment dispersions and combinations of at least two of the components mentioned.

14. A substrate coated or printed on with the UV-curable composition according to claim 1.

15. A UV-curable composition for coating or printing on a substrate and/or a substrate surface comprising:
    at least one monofunctional acrylate monomer/methacrylate monomer having a substituted or unsubstituted monocycloaliphatic hydrocarbon radical,
    at least one vinyl monomer having a substituted or unsubstituted heterocyclic radical, where the heterocyclic radical has at least one ring-forming nitrogen atom,
    at least one monofunctional acrylate monomer/methacrylate monomer having a substituted or unsubstituted bicyclic, nonaromatic hydrocarbon radical and
    at least one photoinitiator,
    wherein the UV-curable composition is free of at least one monofunctional acrylate monomer/methacrylate monomer having a substituted or unsubstituted heterocyclic, nonaromatic radical, and
    the substituted or unsubstituted heterocyclic radical of the vinyl monomer is a substitute or unsubstituted heterocycloaryl radical.

16. The UV-curable composition according to claim 15, wherein the at least one vinyl monomer having a substituted or unsubstituted heterocyclic radical is selected from the group consisting of N-vinylimidazole, methylated N-vinylimidazole and mixtures thereof.

* * * * *